United States Patent
Kaneda (10) Patent No.: US 10,712,106 B2
(45) Date of Patent: Jul. 14, 2020

(54) COOLING TOWER CONTROLLING SYSTEM AND COOLING TOWER CONTROLLING METHOD

(71) Applicant: L'Air Liquide, Societe Anonyme pour l'Etude et l'Exploitation des Procedes Georges Claude, Paris (FR)

(72) Inventor: Takuya Kaneda, Tokyo (JP)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 102 days.

(21) Appl. No.: 15/766,310

(22) PCT Filed: Sep. 23, 2016

(86) PCT No.: PCT/EP2016/072692
§ 371 (c)(1),
(2) Date: Apr. 5, 2018

(87) PCT Pub. No.: WO2017/060103
PCT Pub. Date: Apr. 13, 2017

(65) Prior Publication Data
US 2018/0299214 A1 Oct. 18, 2018

(30) Foreign Application Priority Data
Oct. 5, 2015 (JP) ................. 2015-197750

(51) Int. Cl.
*F28F 27/00* (2006.01)
*F04D 25/06* (2006.01)
*F04D 27/00* (2006.01)

(52) U.S. Cl.
CPC ............ *F28F 27/003* (2013.01); *F04D 25/06* (2013.01); *F04D 27/004* (2013.01); *F28F 2250/08* (2013.01); *Y02B 30/748* (2013.01)

(58) Field of Classification Search
CPC .. F04D 25/06; F04D 27/004; F28C 2001/006; F28F 2250/08; F28F 27/003; Y02B 30/748
See application file for complete search history.

(56) References Cited

U.S. PATENT DOCUMENTS 4,474,027 A * 10/1984 Kaya .................. F28C 1/00
261/26
4,554,964 A * 11/1985 Awano .................. F28F 27/003
165/200

FOREIGN PATENT DOCUMENTS

JP  S54 67251  5/1979
JP  S59 63497  4/1984
(Continued)

OTHER PUBLICATIONS

International Search Report and Written Opinion for PCT/EP2016/072692, dated Feb. 17, 2017.

*Primary Examiner* — Edward F Landrum
*Assistant Examiner* — Chang H Park
(74) *Attorney, Agent, or Firm* — Justin K. Murray (57) ABSTRACT

A cooling tower controlling system includes a plurality of cooling towers, a plurality of pumps, a circulation line through which circulating cooling water flows, a temperature measuring unit, a first load controlling unit, and a second load controlling unit. The temperature measuring unit measures a temperature TE1 of the circulating cooling water at a position upstream of a heat exchange unit and downstream of a storage unit. The first load controlling unit controls a rotational speed of the cooling fans so that an absolute value ΔTE of the difference between the temperature TE1 and an outside air wet-bulb temperature TE0 comes within a first approach temperature AP1 corresponding to a first load in a first load period. The second load controlling unit controls a rotational speed of the cooling fans so that the (Continued)

absolute value $\Delta TE$ of the difference between the temperature $TE1$ and the outside air wet-bulb temperature $TE0$ comes within a second approach temperature $AP2$ corresponding to a second load in a second load period.

7 Claims, 4 Drawing Sheets

(56) References Cited

FOREIGN PATENT DOCUMENTS

| JP | 2010-236728 | 10/2010 |
|----|-------------|---------|
| JP | 2013-210178 | 10/2013 |

* cited by examiner

Fig.5

COOLING TOWER CONTROLLING SYSTEM AND COOLING TOWER CONTROLLING METHOD

CROSS REFERENCE TO RELATED APPLICATIONS

This application is a § 371 of International PCT Application PCT/EP2016/072692, filed Sep. 23, 2016, which claims the benefit of JP 2015-197750, filed Oct. 5, 2015, both of which are herein incorporated by reference in their entireties.

BACKGROUND OF THE INVENTION

Field of the Invention

The present invention relates to a cooling tower controlling system for controlling a plurality of cooling towers that perform temperature control of cooling water used for heat exchange with equipment and a cooling tower controlling method thereof.

Description of the Related Art

Conventionally, there is known a system in which a plurality of cooling towers (for examples, three towers) are disposed, and a cooling water cooled in the cooling towers is supplied to a heat exchanger of equipment by a pump to be subjected to heat exchange with a gas or the like there and thereafter returns to the cooling towers. In order to use night-time electric power that is available at a low cost, a load of the equipment is high at night time (for example, from 22 o'clock to 8 o'clock on the next day), whereas the load of the equipment is low during the day time (for example, from 8 o'clock to 22 o'clock). In order to keep the cooling water at a constant temperature, temperature adjustment is made by respectively operating the cooling fans of the plurality of cooling towers. All of the plurality of cooling fans are subjected to inverter control and are controlled to lower the rotational speed when the load of the equipment is low (day time) or when an outside air temperature is low. By lowering the rotational speed, air flow amount is reduced, and electric power is reduced. However, in the case of the inverter control, there may be cases in which, when it is desired that the temperature of the cooling water is controlled, for example, at 20° C. in spring and autumn seasons, it may not possible to control the water temperature at 20° C. even when the fan output becomes 100% by rise in the outside air temperature during the day time. On the other hand, during the night time, the outside air temperature goes down, so that the water temperature can be controlled at 20° C. even when the fan output is less than or equal to 100%. In other words, the fans must be operated at an output of 100% even during the day time at which the load of the equipment is low. Also, when it is desired that the temperature of the cooling water is controlled, for example, at 15° C. in summer seasons, it may not possible to control the water temperature at 15° C. because the outside air temperature is in a state of being high at all times, so that the fans must be operated at an output of 100% both during the day time and during the night time. In other words, the fans must be operated at an output of 100% even during the day time at which the load of the equipment is low. Also, when it is desired that the temperature of the cooling water is controlled, for example, at 25° C. in winter seasons, the water temperature can be controlled at 25° C. at all times because the outside air temperature is low. During the day time at which the load of the equipment is low, operation is switched in such a manner that, when the three fans reach a threshold value (lowest-limit rotational speed), one cooling fan is stopped, whereby only two cooling fans are operated. When further the two fans reach the threshold value, another cooling fan is stopped, whereby only one cooling fan is operated. JP-A-2013-210178 discloses that the rotational speed of the fans of the plurality of cooling towers is controlled so that a cooling tower outlet temperature will be a set temperature. Also, it is disclosed that one cooling tower is stopped when a state in which the cooling tower outlet temperature is below or equal to a designated temperature 1 (which is a threshold value for forcibly ending a cooling tower and is a temperature based on the lower limit value of the cooling water temperature that is determined by a freezer) is maintained for a predetermined period of time. Also, it is disclosed that one cooling tower is added when a state in which the cooling tower outlet temperature is above or equal to a designated temperature 2 (which is a threshold value for forcibly starting an additional cooling tower and is an outside air wet-bulb temperature or a value obtained by adding an arbitrary margin to the outside air dry-bulb temperature) is maintained for a predetermined period of time.

JP-A-2010-236728 discloses that the number of operating cooling towers is determined by making a reference to an optimum cooling tower capacity relationship that is set in advance on the basis of an outside air wet-bulb temperature and a partial load ratio of a turbo freezer from the viewpoint of improving the efficiency of a heat source system as a whole.

SUMMARY OF THE INVENTION

In the above-described inverter control, three fans must be operated at an output of 100% even during the day time at which the load of the equipment is low in spring, summer, and autumn seasons, resulting in a high electric power consumption amount.

In the above Patent Document 1, the number of operating cooling towers is determined by using two different parameters, that is, by comparing the cooling tower outlet temperature with the designated temperature 1 (temperature based on the lower limit value of the cooling water temperature of the freezer) and the designated temperature 2 (outside air wet-bulb temperature). Also, in Patent Document 2, the number of operating cooling towers is determined on the basis of the outside air wet-bulb temperature, the partial load ratio of the turbo freezer, and the optimum cooling tower capacity relationship. Thus, both adopt a complex controlling method, so that there is a demand for performing temperature control of the cooling water in the plurality of cooling towers by a simpler method.

Also, because the needed cooling water amount differs depending on the load of the equipment, it is demanded that the number of operating cooling towers is controlled in accordance with the load. Though in Patent Document 2 the partial load ratio of the freezer is used as a criterion for determination, the determination conditions are complex as described above. Also, because both of Patent Documents 1 and 2 are based on a feed-back control, the response characteristics are slow, so that a high water temperature rise may occur even temporarily at the time of extreme change in the load.

The present invention has been made in view of the aforementioned current circumstances, and an object thereof is to provide a cooling tower controlling system for controlling a plurality of cooling towers that enables temperature control of cooling water corresponding also to a load of equipment by a simpler method and a cooling tower controlling method thereof.

A cooling tower controlling system for controlling a plurality of cooling towers that perform temperature control of cooling water used for heat exchange with equipment, includes:

the plurality of cooling towers each having a cooling fan, a rotation driving unit which is a driving source for rotating the cooling fan, a supplying unit that supplies circulating cooling water that has passed through a heat exchange unit of the equipment to the cooling tower, and a storage unit that stores the circulating cooling water that has been cooled by air blowing of the cooling fan;

a plurality of pumps that send the circulating cooling water from the storage unit to the heat exchange unit of the equipment;

a circulation line having a pipe that connects respectively between the storage unit and the pumps, between the pumps and the heat exchange unit of the equipment, and between the heat exchange unit and the supplying units of the cooling towers, so as to allow the circulating cooling water to flow therethrough;

a temperature measuring unit that measures a temperature of the circulating cooling water within the circulation line at a position upstream of the heat exchange unit and downstream of the storage unit or a temperature of the circulating cooling water within the storage unit or within the pumps;

a first load controlling unit that controls a rotational speed of the cooling fans with respective rotation driving units so that an absolute value $\Delta TE$ of a difference between the temperature TE1 measured in the temperature measuring unit and an outside air wet-bulb temperature TE0 comes within a first approach temperature AP1, which corresponds to a first load, in a first load period of the equipment; and a second load controlling unit that controls the rotational speed of the cooling fans with respective rotation driving units so that the absolute value $\Delta TE$ of the difference between the temperature TE1 measured in the temperature measuring unit and the outside air wet-bulb temperature TE0 comes within a second approach temperature AP2, which corresponds to a second load higher than the first load and has a lower value than the first approach temperature AP1, in the second load period of the equipment.

This constitution allows that, by controlling the rotational speed of the respective cooling fans so that the absolute value $\Delta TE$ of the difference between the temperature TE1 of the circulating cooling water at a position upstream of the heat exchange unit and the outside air wet-bulb temperature TE0 comes within the approach temperature AP (first approach temperature AP1>second approach temperature AP2), which corresponds to the load of the equipment (first load during the day time <second load during the night time), temperature control of the cooling water corresponding also to the load of the equipment is enabled by a simpler method than that of the above Patent Documents 1 and 2. In other words, when the load of the equipment changes greatly between the day time and the night time, the output of the cooling fans in the respective periods of the day time and the night time can be controlled with little change by changing the approach temperature between the day time and the night time, whereby the cooling fans can be suitably controlled at the time of normal operation.

The position where the "outside air wet-bulb temperature" is measured is not particularly limited, so that the outside air wet-bulb temperature may be measured at a position in any of the inside of the cooling towers, the outside of the cooling towers, the neighborhood of the cooling towers, and the cooling tower controlling system, in the neighborhood of the cooling tower controlling system, or the like. The outside air wet-bulb temperature can be measured, for example, with use of a humidity sensor. Regarding the relationship of "first load"<"second load", the first load may be, for example, 5 to 20 assuming that the second load is 100.

With regard to the relationship of "first approach temperature AP1">"second approach temperature AP2", the approach temperature may be, for example, a threshold value that is set in accordance with the load of the equipment and the outside air wet-bulb temperature. The "second approach temperature AP2" may be, for example, 2 to 7, preferably 3 to 5. The "first approach temperature AP1", which is a value higher than the second approach temperature AP1, may be, for example, 3 to 8, preferably 5 to 7. The difference between the first approach temperature AP1 and the second approach temperature AP2 may be, for example, within a range of 0.5 to 2.0.

As one embodiment of the invention, the first load controlling unit controls to switch from the first approach temperature AP1 to the second approach temperature AP2 before a load of the equipment is switched from the first load to the second load, so as to allow the absolute value $\Delta TE$ of the difference to come within the second approach temperature AP2, and subsequently, operation is switched from the first load controlling unit to the second load controlling unit.

According to this constitution, the water temperature rise can be effectively suppressed, for example, by lowering the approach temperature so as to raise the rotational speed of the cooling fans to increase the air flow amount in advance before the operation is switched from the low-load period during the day time to the high-load period during the night time. In contrast, in the conventional inverter control or feed-back control, the output of the cooling fans rises after the water temperature rises at the timing at which the load is switched from the low load to the high load, so that there has been a band of time at which the water temperature is temporarily high. In the present constitution, an extreme temperature gradient of the water temperature is prevented from being generated by adopting a feed-forward control in which the approach temperature is changed in advance.

As one embodiment of the invention, the second load controlling unit controls to switch from the second approach temperature AP2 to the first approach temperature AP1 before the load of the equipment is switched from the second load to the first load, so as to allow the absolute value $\Delta TE$ of the difference to come within the first approach temperature AP1, and subsequently, operation is switched from the second load controlling unit to the first load controlling unit.

According to this constitution, the motive power can be reduced (energy can be saved), for example, by raising the approach temperature so as to lower the rotational speed of the cooling fans in advance to prevent the circulating cooling water from being cooled to an extent more than is needed before the operation is switched from the high-load period during the night time to the low-load period during the day time.

The above "predetermined period of time before the load switching timing" may be set on the basis of the outside air wet-bulb temperature TE0 and may be, for example, within a range of 1 to 20 minutes.

As one embodiment of the invention, when the rotational speed of at least one or all of the cooling fans of the cooling towers that are in operation exceeds an upper limit threshold value, the first load controlling unit and/or the second load controlling unit makes a setting so that a sum of air flow amounts of the cooling fans of the cooling towers currently in operation and a newly operated cooling tower will be equal to a sum of air flow amounts of the cooling fans of the cooling towers that are in operation before the rotational speed exceeds the upper limit threshold value, and makes a setting so that a sum of amounts of the circulating cooling water supplied from the supplying units of the cooling towers currently in operation and the newly operated cooling tower will be equal to a sum of amounts of the circulating cooling water supplied from the supplying units of the cooling towers that are in operation before the rotational speed exceeds the upper limit threshold value.

The number of the plurality of cooling towers or the cooling towers in operation may be two or more and is not particularly limited.

As one embodiment of the invention, when the rotational speed of at least one or all of the cooling fans of the cooling towers that are in operation becomes lower than a lower limit threshold value, the first load controlling unit and/or the second load controlling unit makes a setting so that a sum of air flow amounts of the cooling fans of the cooling towers that will be in operation in a number less by one than the number of the cooling towers that are currently in operation will be equal to a sum of air flow amounts of the cooling fans of the cooling towers that are in operation before the rotational speed becomes lower than the lower limit threshold value, and makes a setting so that a sum of amounts of the circulating cooling water supplied from the supplying units of the cooling towers that will be in operation in a number less by one than the number of the cooling towers that are currently in operation will be equal to a sum of amounts of the circulating cooling water supplied from the supplying units of the cooling towers that are in operation before the rotational speed becomes lower than the lower limit threshold value, and stops the rotation of the cooling fan of one of the cooling towers and stops supplying the circulating cooling water thereto.

The number of the plurality of cooling towers or the cooling towers in operation may be two or more and is not particularly limited.

According to this constitution, one cooling fan is stopped, for example, when the outside air wet-bulb temperature TE0 lowers and the rotational speed of the cooling fans decreases to the lower limit threshold value while the water temperature is kept constant in a predetermined period of time. At this stage, the remaining cooling fans are set to provide an air flow amount equal to that of the cooling fans before the one cooling fan is stopped. Because a sluice valve of the supplying unit of the cooling tower of the stopped cooling fan is closed to prevent the circulating cooling water from being supplied thereto, the same air flow amount is let to act on the same water amount, so that the cooling performance remains the same, and change in the water temperature is not generated.

The "upper limit threshold value" may be, for example, a rotational speed at the timing at which the motive power that gives an air flow amount of one cooling fan becomes larger than the motive power of two cooling fans that provide the same air flow amount. In other words, the needed motive power decreases to save energy when two cooling towers are operated rather than when only one cooling tower is operated at a rotational speed that exceeds the upper limit threshold value.

The "lower limit threshold value" may be, for example, a rotational speed that gives an air flow amount needed for cooling water. For example, the "lower limit threshold value" may be, for example, a rotational speed at the timing at which the motive power that gives a sum of air flow amounts of two cooling fan becomes larger than the motive power of one cooling fan that provides the same sum of air flow amounts. In other words, the needed motive power decreases to save energy when only one cooling tower is operated rather than when two cooling towers are operated at a rotational speed that is below the lower limit threshold value. Also, the lower limit threshold value may be set on the basis of the minimum ensured rotational speed that the rotation driving unit can control. This will be understood also from the fact that the air flow amount is proportional to the square of the rotational speed and the fact that the motive power is proportional to the cube of the rotational speed.

When the number of cooling towers is increased by one, it is preferable that the sum of air flow amounts before the increase is equal to the sum of air flow amounts after the increase, and the air flow amounts of the cooling fans after the increase are equal to each other. When the number of cooling towers is decreased by one, it is preferable that the sum of air flow amounts before the decrease is equal to the sum of air flow amounts after the decrease, and the air flow amounts of the cooling fans after the decrease are equal to each other.

When the number of cooling towers is increased by one, it is preferable that the sum of amounts of the circulating cooling water before the increase is equal to the sum of amounts of the circulating cooling water after the increase, and the amounts of the circulating cooling water supplied to the cooling towers after the increase are equal to each other. When the number of cooling towers is decreased by one, it is preferable that the sum of amounts of the circulating cooling water before the decrease is equal to the sum of amounts of the circulating cooling water after the decrease, and the amounts of the circulating cooling water supplied to the cooling towers after the decrease are equal to each other.

The sluice valve that each of the above supplying units has is preferably an automatic on-off valve. It is preferable that the first and second load controlling units control the ON/OFF of the automatic on-off valve.

As one embodiment of the invention, when the outside air wet-bulb temperature TE0 is lower than a set value of a minimum temperature of the circulating cooling water by a predetermined value or more, the first load controlling unit and/or the second load controlling unit controls the plurality of cooling towers so that the temperature TE1 of the circulating cooling water will be the set value of the minimum temperature of the circulating cooling water.

According to this constitution, for example, because the outside air wet-bulb temperature goes down extremely at night, control of the circulating cooling water at the set value of the minimum temperature can hardly be made with the outside air wet-bulb temperature. For this reason, this constitution adopts a method in which, when the outside air wet-bulb temperature is extremely low, control is made so that the temperature TE1 of the circulating cooling water will be the set value of the minimum temperature of the circulating cooling water.

As one embodiment of the above invention, for example, in the case in which the plurality of cooling towers are two towers or in the case in which only two of the plurality of cooling towers are operable, when the cooling fan is rotating in the first cooling tower and the circulating cooling water is being supplied thereto while the rotation of the cooling fan of the second cooling tower and the supply of the circulating cooling water thereto are in a state of being stopped, and when the rotational speed of the cooling fan of the first cooling tower exceeds an upper limit threshold value, the first load controlling unit and/or the second load controlling unit makes a setting so that a sum of air flow amounts of the cooling fans of the first and second cooling towers will be equal to the air flow amount of the cooling fan of the first cooling tower before the rotational speed exceeds the upper limit threshold value, and makes a setting so that a sum of amounts of the circulating cooling water supplied from the supplying units of the first and second cooling towers will be equal to the amount of the circulating cooling water supplied from the supplying unit of the first cooling tower before the rotational speed exceeds the upper limit threshold value, and/or when the cooling fan is rotating in each of the first and second cooling towers and the circulating cooling water is being supplied thereto, and when the rotational speed of either one or both of the cooling fans of the first and second cooling towers becomes lower than a lower limit threshold value, the first load controlling unit and/or the second load controlling unit makes a setting so that the air flow amount of the cooling fan of the first cooling tower will be equal to a sum of air flow amounts of the cooling fans of the first and second cooling towers before the rotational speed becomes lower than the lower limit threshold value, and makes a setting so that the amount of the circulating cooling water supplied from the supplying unit of the first cooling tower will be equal to a sum of amounts of the circulating cooling water supplied from the supplying units of the first and second cooling towers before the rotational speed becomes lower than the lower limit threshold value, and stops the rotation of the cooling fan of the second cooling tower and stops supplying the circulating cooling water thereto.

As one embodiment of the above invention, for example, in the case in which the plurality of cooling towers are three towers or in the case in which only three of the plurality of cooling towers are operable, when the cooling fan is rotating in the first cooling tower and the circulating cooling water is being supplied thereto while the rotation of the cooling fans of the second and third cooling towers and the supply of the circulating cooling water thereto are in a state of being stopped, and when the rotational speed of the cooling fan of the first cooling tower exceeds an upper limit threshold value, the first load controlling unit and/or the second load controlling unit makes a setting so that a sum of air flow amounts of the cooling fans of the first and second cooling towers will be equal to the air flow amount of the cooling fan of the first cooling tower before the rotational speed exceeds the upper limit threshold value, and makes a setting so that a sum of amounts of the circulating cooling water supplied from the supplying units of the first and second cooling towers will be equal to the amount of the circulating cooling water supplied from the supplying unit of the first cooling tower before the rotational speed exceeds the upper limit threshold value, and/or when the cooling fan is rotating in each of the first and second cooling towers and the circulating cooling water is being supplied thereto while the rotation of the cooling fan of the third cooling tower and the supply of the circulating cooling water thereto are in a state of being stopped, and when the rotational speed of at least one or both of the cooling fans of the first and second cooling towers exceeds an upper limit threshold value, the first load controlling unit and/or the second load controlling unit makes a setting so that a sum of air flow amounts of the cooling fans of the first, second, and third cooling towers will be equal to a sum of air flow amounts of the cooling fans of the first and second cooling towers before the rotational speed exceeds the upper limit threshold value, and makes a setting so that a sum of amounts of the circulating cooling water supplied from the supplying units of the first, second, and third cooling towers will be equal to a sum of amounts of the circulating cooling water supplied from the supplying units of the first and second cooling towers before the rotational speed exceeds the upper limit threshold value, and/or when the cooling fan is rotating in each of the first, second, and third cooling towers and the circulating cooling water is being supplied thereto, and when the rotational speed of at least one or all of the cooling fans of the first, second, and third cooling towers becomes lower than a lower limit threshold value, the first load controlling unit and/or the second load controlling unit makes a setting so that a sum of air flow amounts of the cooling fans of the first and second cooling towers will be equal to a sum of air flow amounts of the cooling fans of the first, second, and third cooling towers before the rotational speed becomes lower than the lower limit threshold value, and makes a setting so that a sum of amounts of the circulating cooling water supplied from the supplying units of the first and second cooling towers will be equal to a sum of amounts of the circulating cooling water supplied from the supplying units of the first, second, and third cooling towers before the rotational speed becomes lower than the lower limit threshold value, and stops the rotation of the cooling fan of the third cooling tower and stops supplying the circulating cooling water thereto, and/or when the cooling fan is rotating in each of the first and second cooling towers and the circulating cooling water is being supplied thereto while the rotation of the cooling fan of the third cooling tower and the supply of the circulating cooling water thereto are in a state of being stopped, and when the rotational speed of either one or both of the cooling fans of the first and second cooling towers becomes lower than a lower limit threshold value, the first load controlling unit and/or the second load controlling unit makes a setting so that the air flow amount of the cooling fan of the first cooling tower will be equal to a sum of air flow amounts of the cooling fans of the first and second cooling towers before the rotational speed becomes lower than the lower limit threshold value, and makes a setting so that the amount of the circulating cooling water supplied from the supplying unit of the first cooling tower will be equal to a sum of amounts of the circulating cooling water supplied from the supplying units of the first and second cooling towers before the rotational speed becomes lower than the lower limit threshold value, and stops the rotation of the cooling fan of the second cooling tower and stops supplying the circulating cooling water thereto.

In the above "sum of air flow amounts of the cooling fans of the first and second cooling towers", a set ratio of the air flow amount of the cooling fan of the first cooling tower and the air flow amount of the cooling fan of the second cooling tower is preferably 1:1. It goes without saying that the case in which the actual rotational speeds or air flow amounts are not strictly equal to each other due to the individual difference of the equipment or the error is also comprised within the object thereof.

In the above "sum of air flow amounts of the cooling fans of the first, second, and third cooling towers", a set ratio of the air flow amount of the cooling fan of the first cooling tower, the air flow amount of the cooling fan of the second cooling tower, and the air flow amount of the cooling fan of the third cooling tower is preferably 1:1:1. It goes without saying that the case in which the actual rotational speeds or air flow amounts are not strictly equal to each other due to the individual difference of the equipment or the error is also comprised within the object thereof.

In the above "sum of amounts of the circulating cooling water supplied from the supplying units of the first and second cooling towers", a set ratio of the amount of the circulating cooling water supplied from the supplying unit of the first cooling tower and the amount of the circulating cooling water supplied from the supplying unit of the second cooling tower is preferably 1:1. It goes without saying that the case in which, even when the sluice valve of each of the supplying units is opened, the actual supplied amounts are not strictly equal to each other due to the individual difference or the error is also comprised within the object thereof.

In the above "sum of amounts of the circulating cooling water supplied from the supplying units of the first, second, and third cooling towers", a set ratio of the amount of the circulating cooling water supplied from the supplying unit of the first cooling tower, the amount of the circulating cooling water supplied from the supplying unit of the second cooling tower, and the amount of the circulating cooling water supplied from the supplying unit of the third cooling tower is preferably 1:1:1. It goes without saying that the case in which, even when the sluice valve of each of the supplying units is opened, the actual supplied amounts are not strictly equal to each other due to the individual difference or the error is also comprised within the object thereof.

A cooling tower controlling method for controlling a plurality of cooling towers, each having a cooling fan, that perform temperature control of cooling water used for heat exchange with equipment, includes:
 a first load controlling step that controls a rotational speed of the cooling fans so that an absolute value $\Delta TE$ of a difference between a temperature $TE1$ of circulating cooling water at a position between a heat exchange unit of the equipment and a storage unit of the cooling towers and an outside air wet-bulb temperature $TE0$ comes within a first approach temperature $AP1$, which corresponds to a first load, in a first load period of the equipment; and
 a second load controlling step that controls the rotational speed of the cooling fans so that the absolute value $\Delta TE$ of the difference between the temperature $TE1$ of the circulating cooling water at the position between the heat exchange unit of the equipment and the storage unit of the cooling towers and the outside air wet-bulb temperature $TE0$ comes within a second approach temperature $AP2$, which corresponds to a second load higher than the first load and has a lower value than the first approach temperature $AP1$, in the second load period of the apparatus.

As one embodiment of the above invention, the first load controlling step is adapted to perform a control to switch from the first approach temperature $AP1$ to the second approach temperature $AP2$ before a load of the equipment is switched from the first load to the second load, so as to allow the absolute value $\Delta TE$ of the difference to come within the second approach temperature $AP2$, and subsequently, transition is made from the first load controlling step to the second load controlling step, and/or the second load controlling step is adapted to perform a control to switch from the second approach temperature $AP2$ to the first approach temperature $AP1$ before the load of the equipment is switched from the second load to the first load, so as to allow the absolute value $\Delta TE$ of the difference to come within the first approach temperature $AP1$, and subsequently, transition is made from the second load controlling step to the first load controlling step.

As one embodiment of the above invention, when the outside air wet-bulb temperature is lower than a predetermined value, the first load controlling step and/or the second load controlling step restricts the number of operable cooling towers among the plurality of cooling towers.

As one embodiment of the above invention, the cooling tower controlling method further includes:
 a step of increasing the number of operating cooling towers in which, when the rotational speed of at least one or all of the cooling fans of the cooling towers that are in operation (total number of cooling towers being (i)) exceeds an upper limit threshold value, the step makes a setting so that a sum of air flow amounts of the cooling fans of the cooling towers currently in operation and a newly operated cooling tower (total number of cooling towers being (i+1)) will be equal to a sum of air flow amounts of the cooling fans of the cooling towers that are in operation (total number of cooling towers being (i)) before the rotational speed exceeds the upper limit threshold value, and makes a setting so that a sum of amounts of the circulating cooling water supplied from the supplying units of the cooling towers currently in operation and the newly operated cooling tower (total number of cooling towers being (i+1)) will be equal to a sum of amounts of the circulating cooling water supplied from the supplying units of the cooling towers that are in operation (total number of cooling towers being (i)) before the rotational speed exceeds the upper limit threshold value, and/or
 a step of decreasing the number of operating cooling towers in which, when the rotational speed of at least one or all of the cooling fans of the cooling towers that are in operation (total number of cooling towers being (i)) becomes lower than a lower limit threshold value, the step makes a setting so that a sum of air flow amounts of the cooling fans of the cooling towers that will be in operation in a number less by one (total number of cooling towers being (i−1)) than the number of the cooling towers that are currently in operation will be equal to a sum of air flow amounts of the cooling fans of the cooling towers that are in operation (total number of cooling towers being (i)) before the rotational speed becomes lower than the lower limit threshold value, and makes a setting so that a sum of amounts of the circulating cooling water supplied from the supplying units of the cooling towers that will be in operation in a number less by one (total number of cooling towers being (i−1)) than the number of the cooling towers that are currently in operation will be equal to a sum of amounts of the circulating cooling water supplied from the supplying units of the cooling towers that are in operation (total number of cooling towers being (i)) before the rotational speed becomes lower than the lower limit threshold value, and stops the rotation of the cooling fan of one of the cooling towers and stops supplying the circulating cooling water thereto.

The "equipment" may be, for example, an air separation equipment, an $N_2$ liquefier, an oxygen plant, or the like.

DETAILED DESCRIPTION OF THE PREFERRED EMBODIMENTS (Cooling Tower Controlling System)

Figure 1:
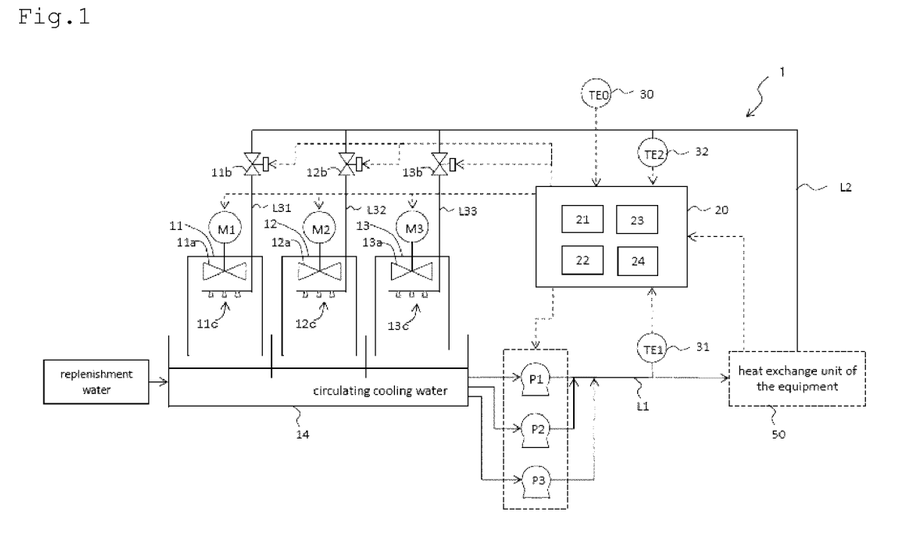
FIG. 1 is a view illustrating a constitution example of a cooling tower controlling system.

A cooling tower controlling system 1 will be described with reference to the attached drawings. In the present embodiment, the system is constructed by having three cooling towers and three supplying pumps; however, the present invention is not limited to this constitution alone.

A first cooling tower 11 has a first cooling fan 11a, a first motor M1 (corresponding to a rotation driving unit) which is a driving source for rotating the first cooling fan 11a, a first supplying unit (11b, 11c) that supplies circulating cooling water W that has passed through a heat exchange unit 50 of equipment to the first cooling tower 11, and a storage unit 14 that stores the circulating cooling water W that has been cooled by air blowing of the first cooling fan 11a. The first supplying unit has a first pipe L31, a first sluice valve 11b disposed in the first pipe L31, and a plurality of nozzles 11c that are disposed at a position which is in the first cooling tower 11 and which is at the forward end side of the first pipe L31.

A second cooling tower 12 has a second cooling fan 12a, a second motor M2 (corresponding to a rotation driving unit) which is a driving source for rotating the second cooling fan 12a, a second supplying unit (12b, 12c) that supplies the circulating cooling water W that has passed through the heat exchange unit 50 of the equipment to the second cooling tower 12, and a storage unit 14 that stores the circulating cooling water W that has been cooled by air blowing of the second cooling fan 12a. The second supplying unit has a second pipe L32, a second sluice valve 12b disposed in the second pipe L32, and a plurality of nozzles 12c that are disposed at a position which is in the second cooling tower 12 and which is at the forward end side of the second pipe L32.

A third cooling tower 13 has a third cooling fan 13a, a third motor M3 (corresponding to a rotation driving unit) which is a driving source for rotating the third cooling fan 13a, a third supplying unit (13b, 13c) that supplies the circulating cooling water W that has passed through the heat exchange unit 50 of the equipment to the third cooling tower 13, and a storage unit 14 that stores the circulating cooling water W that has been cooled by air blowing of the third cooling fan 13a. The third supplying unit has a third pipe L33, a third sluice valve 13b disposed in the third pipe L33, and a plurality of nozzles 13c that are disposed at a position which is in the third cooling tower 13 and which is at the forward end side of the third pipe L33.

In the present embodiment, a constitution is adopted in which the storage unit 14 is used in common in the first, second, and third cooling towers 11, 12, and 13. However, the present invention is not limited to this constitution, so that a storage unit may be provided in each of the cooling towers. In this case, a constitution may be adopted in which the circulating cooling water W joins together in the pipe before being sent from each storage unit to the supplying pump, or alternatively, a buffer tank may be provided (any one of the storage units may serve as the buffer tank as well) so that the circulating cooling water W may join together in this buffer tank.

First, second, and third supplying pumps P1, P2, and P3 send the circulating cooling water W from the storage unit 14 to the heat exchange unit 50 of the equipment. A controlling unit 20 may control to restrict the number of operating pumps in accordance with the load of the equipment or in accordance with the number of operating cooling towers. The controlling unit 20 may operate, for example, three supplying pumps when the load is high, and may operate one or two supplying pumps when the load is low.

A circulation line has a supplying pipe L1 disposed between the storage unit 14 and the first to third supplying pumps P1 to P3 and between the first to third supplying pumps P1 to P3 and the heat exchange unit 50 of the equipment and has a return pipe L2 disposed between the heat exchange unit 50 and the first to third supplying units of the first to third cooling towers 11 to 13. The circulating cooling water W flows through the pipes L1 and L2. The return pipe L2 is branched into the first pipe L31, the second pipe L32, and the third pipe L33.

A temperature measuring unit 31 measures a water temperature of the circulating cooling water W in the supplying pipe L1 at a position upstream of the heat exchange unit 50 and downstream of the storage unit 14. In the present embodiment, the temperature measuring unit 31 measures the water temperature of the circulating cooling water W flowing in the supplying pipe L1 at a position downstream of the supplying pumps and upstream of the heat exchange unit 50. It is preferable that the temperature measuring unit 31 measures in real time; however, the temperature measuring unit 31 may measure intermittently at a predetermined timing. The temperature measuring unit 31 sends data of the measured temperature TE1 to the controlling unit 20.

A wet-bulb temperature measuring unit 30 measures an outside air wet-bulb temperature TE0. It is preferable that the wet-bulb temperature measuring unit 30 measures in real time; however, the wet-bulb temperature measuring unit 30 may measure intermittently at the same predetermined timing as that of the temperature measuring unit 31. The wet-bulb temperature measuring unit 30 sends data of the measured outside air wet-bulb temperature TE0 to the controlling unit 20. The wet-bulb temperature measuring unit 30 is disposed at a certain position in the site where the present system is placed. Here, the wet-bulb temperature measuring unit 30 is preferably disposed at a position that is less liable to be affected by external turbulence such as a heat source or a high humidity source.

The controlling unit 20 has a first memory 23 that stores the data of the outside air wet-bulb temperature TE0 sent from the wet-bulb temperature measuring unit 30 and the data of the temperature TE1 sent from the temperature measuring unit 31. Here, the first memory 23 may be adapted to store temporarily or may be adapted to store for a predetermined period of time. The controlling unit 20 has a second memory 24. The second memory 24 stores data of the period of the first load and the period of the second load (>first load) of the equipment. The data of the periods may be, for example, data having a month, a day, and a time. Examples of the data may be [first load: from 8 o'clock till 22 o'clock on September 23rd], [second load: from 22 o'clock to 24 o'clock on September 23rd and from 0 o'clock till 8 o'clock on September 24th], or [first load: from 8 o'clock till 22 o'clock], [second load: from 22 o'clock till 8 o'clock on the next day]. These data of the periods may be data that are input by an input unit not illustrated in the drawings or received by a communication unit to be stored in the second memory 24 or data that are sent from a controlling unit of the equipment not illustrated in the drawings to be stored in the second memory 24. Also, the second memory 24 stores a first approach temperature AP1 and a second approach temperature AP2. The first approach temperature AP1 and the second approach temperature AP2 each have a value that accords, for example, to the seasons, the days and months, and the degree of the load range (100% to 20%). The controlling unit 20 may have a hardware such as a CPU (or MPU), a circuit, a firmware, a memory for storing a software program, and the like.

The controlling unit 20 has a first load controlling unit 21 and a second load controlling unit 22. The first load controlling unit 21 controls a rotational speed of the first to third cooling fans 11a to 13a with the first to third motors M1 to M3 so that an absolute value ΔTE of a difference between the temperature TE1 and the outside air wet-bulb temperature TE0 (ΔTE=ABS (TE0−TE1)) comes within the first approach temperature AP1 which corresponds to the first load of the equipment. The first load controlling unit 21 can select a value that accords, for example, to the seasons, the days and months, and the degree of the load range (100% to 20%). In the present embodiment, the first approach temperature AP1 may be, for example, "6° C.".

The second load controlling unit 22 controls a rotational speed of the first to third cooling fans 11a to 13a with the first to third motors M1 to M3 so that the absolute value ΔTE of the difference between the temperature TE1 and the outside air wet-bulb temperature TE0 comes within the second approach temperature AP2 (<first approach temperature AP1) which corresponds to the second load (>first load) of the equipment. The second load controlling unit 22 can select a value that accords, for example, to the seasons, the days and months, and the degree of the load range (100% to 20%). In the present embodiment, the second approach temperature AP2 may be, for example, "4° C.".

Figure 2:
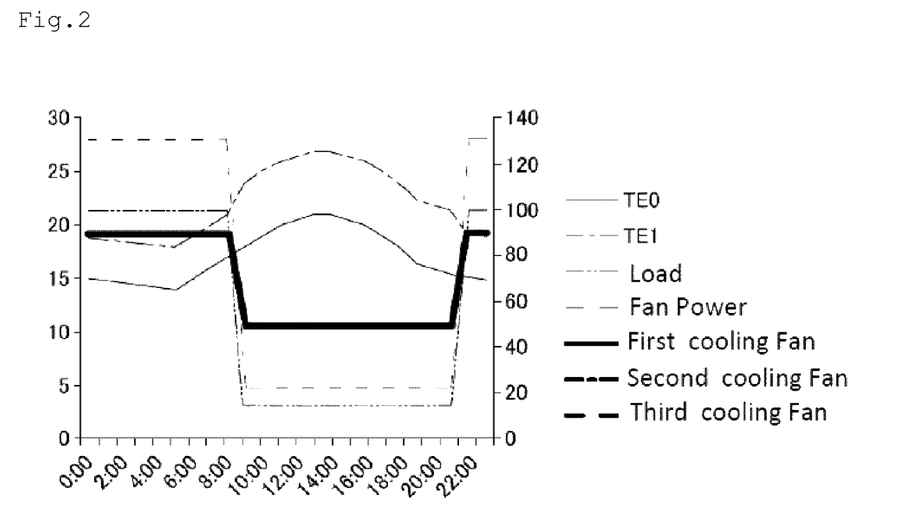
FIG. 2 is a graph showing water temperature and an operation state of cooling fans at the time of ordinary control, where the left-side longitudinal axis represents a temperature, and the right-side longitudinal axis represents a load.

FIG. 2 shows the water temperature and the state of operation of the cooling fans at the time of ordinary control. In FIG. 2, the first load (low load) period is a period from 8 o'clock till 22 o'clock, and the second load (high load) period is a period from 22 o'clock till 8 o'clock on the next day. Assuming that the second load is 100%, the first load is 18%. The approach temperature is switched between the first load period and the second load period. The air flow power of the first to third cooling fans 11a to 13a changes little over the first load period and the second load period.

Figure 3A:
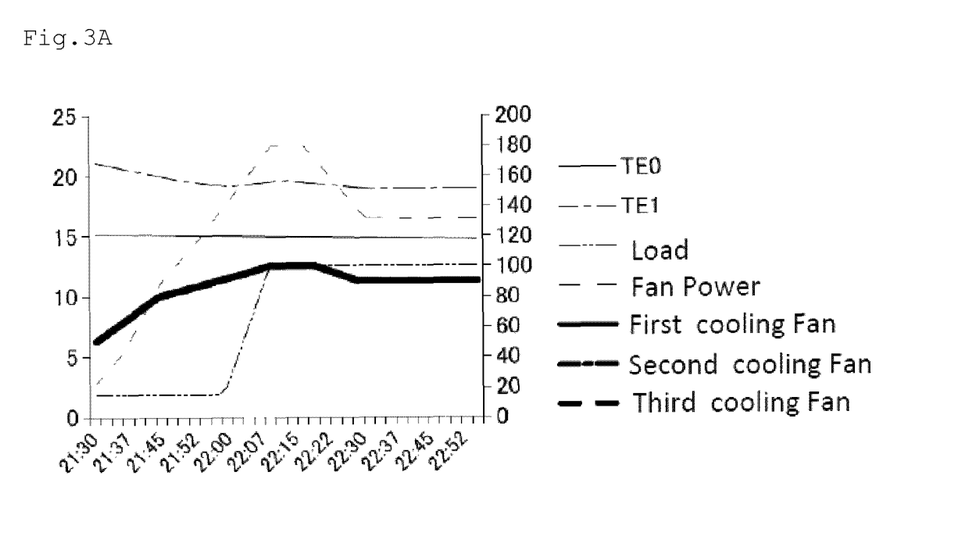
FIG. 3A is a graph showing water temperature and an operation state of cooling fans when the load is changed, where the left-side longitudinal axis represents a temperature, and the right-side longitudinal axis represents a load.
Figure 3B:
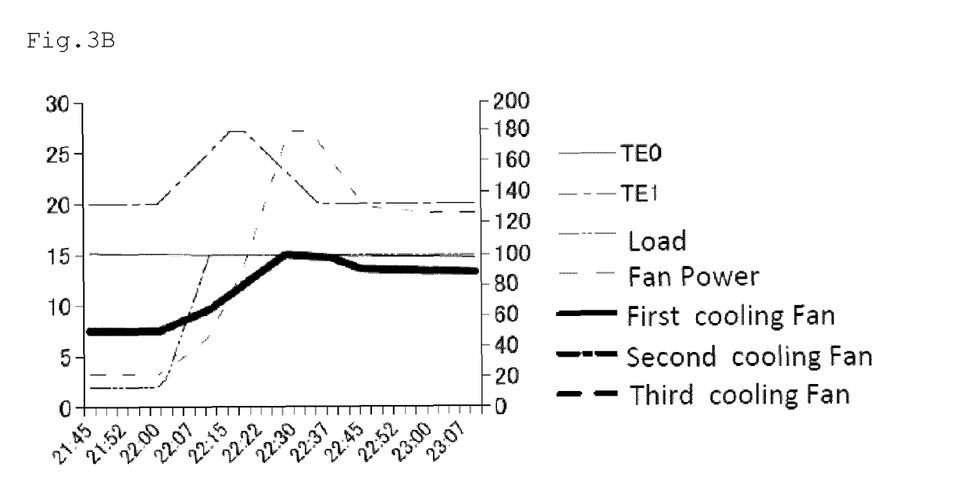
FIG. 3B is a graph showing water temperature and an operation state of cooling fans when the load is changed in a conventional example, where the left-side longitudinal axis represents a temperature, and the right-side longitudinal axis represents a load.

Also, the first load controlling unit 21 controls to switch from the first approach temperature AP1 to the second approach temperature AP2 before the load of the equipment is switched from the first load to the second load, for example, a predetermined period of time before the load switching timing, so as to allow the absolute value ΔTE of the difference to come within the second approach temperature AP2, and subsequently, operation is switched from the first load controlling unit 21 to the second load controlling unit 22. FIGS. 3A and 3B show the water temperature and the state of operation of the cooling fans when the load changes. FIG. 3A shows a state of the present embodiment. By lowering the approach temperature so as to raise the rotational speed of the cooling fans to increase the air flow amount in advance before the operation is switched from the low-load period during the day time to the high-load period during the night time, the water temperature rise caused by response delay at the time of switching can be suppressed. In contrast, an example of the conventional inverter control or feed-back control is shown in FIG. 3B. The output of the cooling fans rises after the water temperature rises at the timing at which the load is switched from the low load to the high load, so that there is a band of time at which the water temperature is temporarily high. In the present embodiment, an extreme change in the water temperature is prevented from being generated by adopting a feed-forward control in which the approach temperature is changed in advance.

Also, it is possible to adopt a constitution in which the second load controlling unit 22 controls to switch from the second approach temperature AP2 to the first approach temperature AP1 before the load of the equipment is switched from the second load to the first load, for example, a predetermined period of time before the load switching timing, so as to allow the absolute value ΔTE of the difference to come within the first approach temperature AP1, and subsequently, operation is switched from the second load controlling unit 22 to the first load controlling unit 21.

(Method of Increasing the Number of Operating Cooling Towers)

Also, when only the first cooling tower 11 is operating and when the rotational speed of the first cooling fan 11a of the first cooling tower 11 exceeds an upper limit threshold value, the first and/or second load controlling unit 21, 22 makes a setting so that a sum of air flow amounts of the first and second cooling fans 11a, 12a of the first and second cooling towers 11, 12 will be equal to the air flow amount of the first cooling fan 11a of the first cooling tower 11 before the rotational speed exceeds the upper limit threshold value. In the present embodiment, the first and/or second load controlling unit 21, 22 gives an instruction to the first and second motors M1, M2 to set the rotational speed of the fans to control the air flow amounts. A set ratio of the air flow amount (rotational speed) of the first cooling fan 11a and the air flow amount (rotational speed) of the second cooling fan 12a is preferably 1:1. Further, the first and/or second load controlling unit 21, 22 makes a setting so that a sum of amounts of the circulating cooling water W supplied from the first and second supplying units of the first and second cooling towers 11, 12 will be equal to the amount of the circulating cooling water W supplied from the first supplying unit of the first cooling tower 11 before the rotational speed exceeds the upper limit threshold value. In the present embodiment, the first and/or second load controlling unit 21, 22 controls the first and second sluice valves 11b, 12b. A set ratio of the amount of the circulating cooling water W supplied from the first supplying unit and the amount of the circulating cooling water W supplied from the second supplying unit is preferably 1:1.

Also, when only the first and second cooling towers 11, 12 are operating and when the rotational speed of both of the first and second cooling fans 11a, 12a of the first and second cooling towers 11, 12 exceeds an upper limit threshold value, the first and/or second load controlling unit 21, 22 makes a setting so that a sum of air flow amounts of the first, second, and third cooling fans 11a, 12a, and 13a of the first, second, and third cooling towers 11, 12, 13 will be equal to a sum of air flow amounts of the first and second cooling fans 11a, 12a before the rotational speed exceeds the upper limit threshold value. In the present embodiment, the first and/or second load controlling unit 21, 22 gives an instruction to the first, second, and third motors M1, M2, M3 to set the rotational speed of the fans to control the air flow amounts. A set ratio of the air flow amount (rotational speed) of the first cooling fan 11a, the air flow amount (rotational speed) of the second cooling fan 12a, and the air flow amount (rotational speed) of the third cooling fan 13a is preferably 1:1:1. Further, the first and/or second load controlling unit 21, 22 makes a setting so that a sum of amounts of the circulating cooling water W supplied from the first, second, and third supplying units will be equal to a sum of amounts of the circulating cooling water W supplied from the first and second supplying units before the rotational speed exceeds the upper limit threshold value. In the present embodiment, the first and/or second load controlling unit 21, 22 controls the first, second, and third sluice valves 11b, 12b, 13b. A set ratio of the amount of the circulating cooling water W supplied from the first supplying unit, the amount of the circulating cooling water W supplied from the second supplying unit, and the amount of the circulating cooling water W supplied from the third supplying unit is preferably 1:1:1.

(Method of Decreasing the Number of Operating Cooling Towers)

Also, when the first, second, and third cooling towers 11, 12, 13 are operating and when the rotational speed of all of the first, second, and third cooling fans 11a, 12a, 13a of the first, second, and third cooling towers 11, 12, 13 becomes lower than a lower limit threshold value, the first and/or second load controlling unit 21, 22 makes a setting so that a sum of air flow amounts of the first and second cooling fans 11a, 12a will be equal to a sum of air flow amounts of the first, second, and third cooling fans 11a, 12a, 13a before the rotational speed becomes lower than the lower limit threshold value, and stops the rotation of the third cooling fan 13a. In the present embodiment, the first and/or second load controlling unit 21, 22 gives an instruction to the first and second motors M1, M2 to set the rotational speed of the fans to control the air flow amounts and stops the third motor M3. A set ratio of the air flow amount of the first cooling fan 11a and the air flow amount of the second cooling fan 12a is preferably 1:1. Further, the first and/or second load controlling unit 21, 22 makes a setting so that a sum of amounts of the circulating cooling water W supplied from the first and second supplying units will be equal to a sum of amounts of the circulating cooling water W supplied from the first, second, and third supplying units before the rotational speed becomes lower than the lower limit threshold value, and stops supplying the circulating cooling water W to the third supplying unit. In the present embodiment, the first and/or second load controlling unit 21, 22 gives an instruction to control the first and second automatic on-off sluice valves 11b, 12b and to close the third sluice valve 13b. A set ratio of the amount of the circulating cooling water W supplied from the first supplying unit and the amount of the circulating cooling water W supplied from the second supplying unit is preferably 1:1.

Also, when only the first and second cooling towers 11, 12 are operating and when the rotational speed of both of the first and second cooling fans 11a, 12a of the first and second cooling towers 11, 12 becomes lower than a lower limit threshold value, the first and/or second load controlling unit 21, 22 makes a setting so that the air flow amount of the first cooling fan 11a will be equal to a sum of air flow amounts of the first and second cooling fans 11a, 12a before the rotational speed becomes lower than the lower limit threshold value, and stops the rotation of the second cooling fan 12a. In the present embodiment, the first and/or second load controlling unit 21, 22 gives an instruction to the first motor M1 to set the rotational speed of the fan to control the air flow amount and stops the second motor M2. Further, the first and/or second load controlling unit 21, 22 makes a setting so that the amount of the circulating cooling water W supplied from the first supplying unit will be equal to a sum of amounts of the circulating cooling water W supplied from the first and second supplying units before the rotational speed becomes lower than the lower limit threshold value, and stops supplying the circulating cooling water W to the second supplying unit. In the present embodiment, the first and/or second load controlling unit 21, 22 gives an instruction to control the first automatic on-off sluice valve 11b and to close the second sluice valve 12b.

Figure 4A:
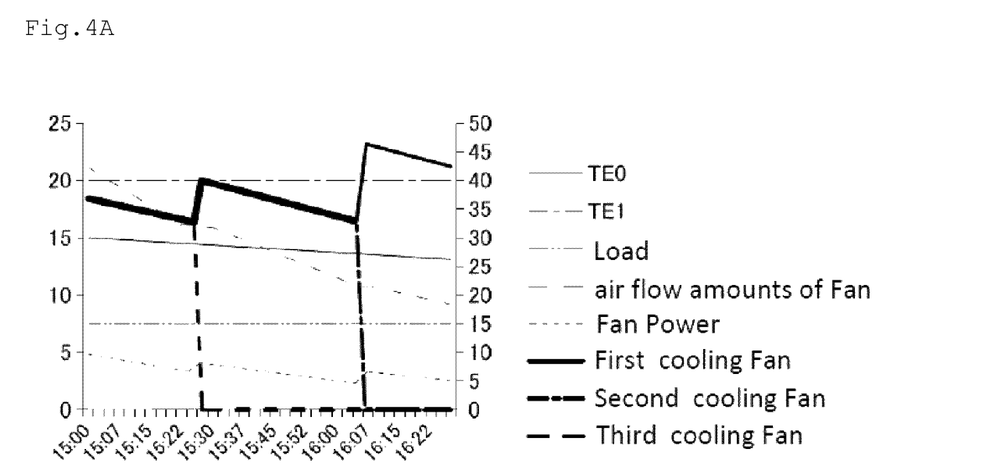
FIG. 4A is a graph showing stoppage control of the cooling fans, where the left-side longitudinal axis represents a temperature, and the right-side longitudinal axis represents a load.
Figure 4B:
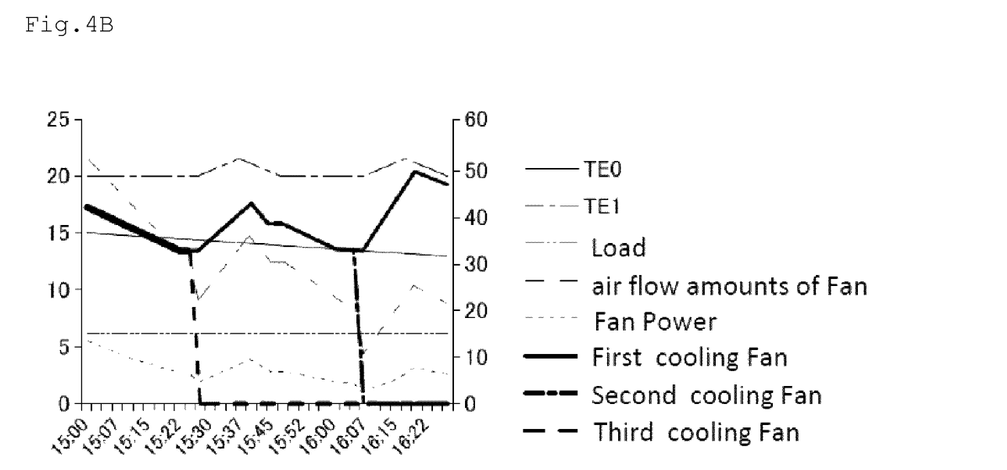
FIG. 4B is a graph showing stoppage control of the cooling fans in a conventional example, where the left-side longitudinal axis represents a temperature, and the right-side longitudinal axis represents a load.

FIGS. 4A and 4B show stoppage control of the cooling fans. FIG. 4A shows a stoppage state of the present embodiment. In FIG. 4A, the lower limit threshold value is 33%. It is set that the rotational speeds of the cooling fans are equal to each other. At the time point of 15:00, three cooling fans were operating. However, at the time point of 15:28 at which the rotational speeds of all the cooling fans became lower than the lower limit threshold value of 33%, the third cooling fan stopped, and subsequently, at the time point of 16:07 at which the rotational speeds of the two cooling fans became lower than the lower limit threshold value of 33%, the second cooling fan stopped. When one cooling fan is stopped, the sum of air flow amounts of the remaining cooling fans is adjusted to be equal to the sum of air flow amounts of the cooling fans before the one cooling fan has stopped. Therefore, the temperature of the circulating cooling water W is kept constant. In contrast, an example of the conventional inverter control or feed-back control is shown in FIG. 4B. When the number of operating cooling fans is changed from three to two or from two to one, one cooling fan is simply stopped without making an output adjustment of the cooling fans, so that the water temperature rises. Here, though the lower limit threshold value is set to be 33% in the present embodiment, the present invention is not limited to this alone.

(Controlling Method in Winter Seasons)

When the outside air wet-bulb temperature TE0 is lower than a set value of a minimum temperature of the circulating cooling water W by a predetermined value or more, the first and/or second load controlling unit 21, 22 controls the plurality of cooling towers so that the temperature TE1 of the circulating cooling water W will be the set value of the minimum temperature of the circulating cooling water W. Here, the "minimum temperature of the cooling water" is set in advance and is stored in a memory of the controlling unit (for example, in the second memory 24), where the minimum temperature can be set to be, for example, 12° C. The "predetermined value" may be, for example, the approach temperature. In winter seasons, there is a time band (for example, during the night) in which the outside air wet-bulb temperature TE0 is considerably lower than this set value of the minimum temperature. In such a case, it is difficult to control the cooling towers with use of the absolute value ΔTE of the difference and the approach temperature. For this reason, when the outside air wet-bulb temperature TE0 is lower than the set value of the minimum temperature by the predetermined value or more, the first and/or second load controlling unit 21, 22 controls the first, second, and third cooling fans 11a, 12a, 13a so that the temperature TE1 of the circulating cooling water W will be the set value of the minimum temperature.

In this case as well, when the rotational speed of all of the first, second, and third cooling fans 11a, 12a, 13a of the first, second, and third cooling towers 11, 12, 13 becomes lower than the lower limit threshold value, the first and/or second load controlling unit 21, 22 makes a setting so that a sum of air flow amounts of the first and second cooling fans 11a, 12a will be equal to a sum of air flow amounts of the first, second, and third cooling fans 11a, 12a, 13a before the rotational speed becomes lower than the lower limit threshold value, and stops the rotation of the third cooling fan 13a. Further, when the rotational speed of both of the first and second cooling fans 11a, 12a becomes lower than the lower limit threshold value, the first and/or second load controlling unit 21, 22 makes a setting so that the air flow amount of the first cooling fan 11a will be equal to a sum of air flow amounts of the first and second cooling fans 11a, 12a before the rotational speed becomes lower than the lower limit threshold value, and stops the rotation of the second cooling fan 12a.

Also, when only the first cooling tower 11 is operating and when the rotational speed of the first cooling fan 11a of the first cooling tower 11 exceeds the upper limit threshold value, the first and/or second load controlling unit 21, 22 makes a setting so that a sum of air flow amounts of the first and second cooling fans 11a, 12a of the first and second cooling towers 11, 12 will be equal to the air flow amount of the first cooling fan 11a of the first cooling tower 11 before the rotational speed exceeds the upper limit threshold value. Further, when only the first and second cooling towers 11, 12 are operating and when the rotational speed of both of the first and second cooling fans 11a, 12a of the first and second cooling towers 11, 12 exceeds the upper limit threshold value, the first and/or second load controlling unit 21, 22 makes a setting so that a sum of air flow amounts of the first, second, and third cooling fans 11a, 12a, and 13a of the first, second, and third cooling towers 11, 12, 13 will be equal to a sum of air flow amounts of the first and second cooling fans 11a, 12a before the rotational speed exceeds the upper limit threshold value.

Further, in winter seasons as well, when the difference between the outside air wet-bulb temperature TE0 and the set value of the minimum temperature is small (for example, within the approach temperature), the first and/or second load controlling unit 21, 22 controls the cooling towers with use of the absolute value ΔTE of the difference and the approach temperature as described above. For example, the operation is switched to make a control with use of the absolute value ΔTE of the difference and the approach temperature during the day.

As described above, because the outside air wet-bulb temperature goes down extremely at night in winter seasons and the like, control of the circulating cooling water W at the set value of the minimum temperature thereof can hardly be made with the outside air wet-bulb temperature TE0. For this reason, a method is adopted in which, when the outside air wet-bulb temperature TE0 is extremely low, control is made so that the temperature TE1 of the circulating cooling water W will be the set value of the minimum temperature of the circulating cooling water W.

Figure 5:
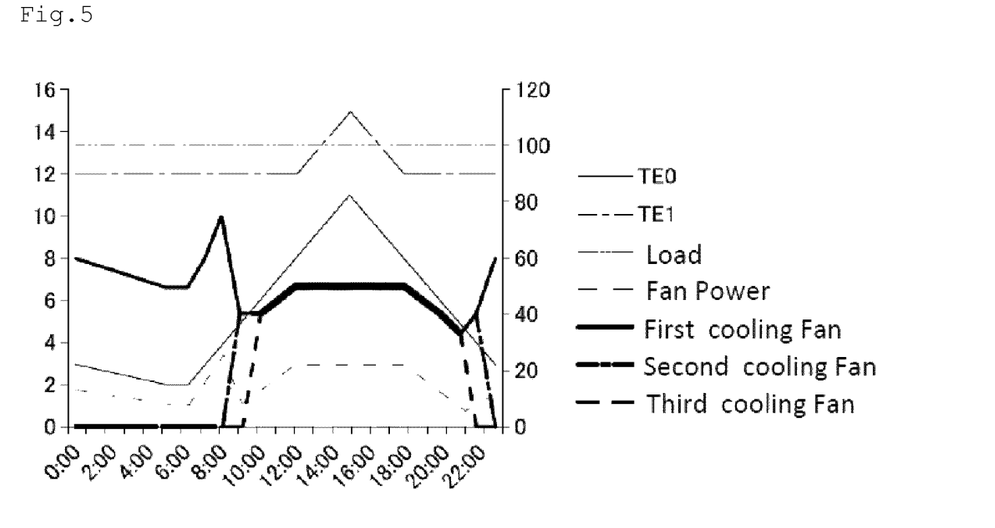
FIG. 5 is a graph showing one example of an operation state of cooling towers in a winter season, where the left-side longitudinal axis represents a temperature, and the right-side longitudinal axis represents a load.

FIG. 5 shows one example of an operation state of the cooling towers in winter seasons. In FIG. 5, during the night at which the outside air wet-bulb temperature TE0 is low, the first cooling fan is operating. However, according as the outside air wet-bulb temperature TE0 rises, the second cooling fan starts operating at 8 o'clock, and further, the third cooling fan starts operating when it is past 9 o'clock. When it is past 20 o'clock and the outside air wet-bulb temperature TE0 goes down, the third cooling fan stops operating, and subsequently, at 22 o'clock, the second cooling fan stops operating.

(Control of the Number of Cooling Towers Based on the Number of Operating Supplying Pumps)

The controlling unit 20 controls the number of operating cooling towers on the basis of the number of operating supplying pumps. For example, when two supplying pumps are operating, it may not be possible to treat the whole amount of the circulating cooling water with use of one cooling tower (or with use of cooling towers the number of which is smaller than that of the supplying pumps). One of the reasons therefor is that the cooling water cannot be supplied in an amount larger than or equal to the maximum supply amount (larger than or equal to the flow rate) of the supplying unit of the cooling tower, whereby the cooling water may in some cases overflow from the upper part of the cooling tower. In order to avoid such a situation, the controlling unit 20 makes a control so that the supplying units of at least the same number of cooling towers as that of the supplying pumps are operated. For example, when two supplying pumps are operating, a control is made so that the sluice valves of two or more supplying units are let to open even when only one cooling fan is operating. Also, when only one supplying pump is operating and only one cooling fan is operating, a control is made so that, when one more supplying pump starts operating, the sluice valve of the supplying unit of the cooling tower that is in a stoppage state is let to open. In one embodiment, the sluice valves of three cooling towers are in an opened state when three supplying pumps are operating; the sluice valves of two cooling towers are in an opened state when two supplying pumps are operating; and the sluice valve of one cooling tower is in an opened state when one supplying pump is operating.

Also, the cooling tower controlling system 1 or the first to third cooling towers 11 to 13 may have a supplying line that replenishes the storage unit 14 with replenishment water.

(Controlling Method)

A cooling tower controlling method for controlling a plurality of cooling towers that perform temperature control of cooling water used for heat exchange with equipment includes:

a first load controlling step that controls a rotational speed of the first to third cooling fans 11a to 13a so that an absolute value ΔTE of a difference between a temperature TE1 of circulating cooling water W at a position between a heat exchange unit of the equipment and a storage unit 14 of the first to third cooling towers 11 to 13 and an outside air wet-bulb temperature TE0 comes within a first approach temperature AP1, which corresponds to a first load, in a first load period of the equipment; and a second load controlling step that controls the rotational speed of the first to third cooling fans 11a to 13a so that the absolute value ΔTE of the difference between the temperature TE1 of the circulating cooling water W at the position between the heat exchange unit of the equipment and the storage unit 14 of the first to third cooling towers 11 to 13 and the outside air wet-bulb temperature TE0 comes within a second approach temperature AP2, which corresponds to a second load higher than the first load, in the second load period of the equipment.

The first load controlling step is adapted to perform a control to switch from the first approach temperature AP1 to the second approach temperature AP2 before a load of the equipment is switched from the first load to the second load, so as to allow the absolute value ΔTE of the difference to come within the second approach temperature AP2, and subsequently, transition is made from the first load controlling step to the second load controlling step. The second load controlling step is adapted to perform a control to switch from the second approach temperature AP2 to the first approach temperature AP1 before the load of the equipment is switched from the second load to the first load, so as to allow the absolute value ΔTE of the difference to come within the first approach temperature AP1, and subsequently, transition is made from the second load controlling step to the first load controlling step.

When the outside air wet-bulb temperature TE0 is lower than a set value of a minimum temperature of the circulating cooling water W by a predetermined value or more, the first and/or second load controlling step controls the plurality of cooling towers so that the temperature TE1 of the circulating cooling water W will be the set value of the minimum temperature of the circulating cooling water W.

The cooling tower controlling method further includes a step of increasing the number of operating cooling towers in which, when the rotational speed of at least one or all of the cooling fans of the cooling towers that are in operation (total number of cooling towers being (i)) exceeds an upper limit threshold value, the step makes a setting so that a sum of air flow amounts of the cooling fans of the cooling towers currently in operation and a newly operated cooling tower (total number of cooling towers being (i+1)) will be equal to a sum of air flow amounts of the cooling fans of the cooling towers that are in operation (total number of cooling towers being (i)) before the rotational speed exceeds the upper limit threshold value, and makes a setting so that a sum of amounts of the circulating cooling water supplied from the supplying units of the cooling towers currently in operation and the newly operated cooling tower (total number of cooling towers being (i+1)) will be equal to a sum of amounts of the circulating cooling water supplied from the supplying units of the cooling towers that are in operation (total number of cooling towers being (i)) before the rotational speed exceeds the upper limit threshold value.

The cooling tower controlling method further includes a step of decreasing the number of operating cooling towers in which, when the rotational speed of at least one or all of the cooling fans of the cooling towers that are in operation (total number of cooling towers being (i)) becomes lower than a lower limit threshold value, the step makes a setting so that a sum of air flow amounts of the cooling fans of the cooling towers that will be in operation in a number less by one (total number of cooling towers being (i−1)) than the number of the cooling towers that are currently in operation will be equal to a sum of air flow amounts of the cooling fans of the cooling towers that are in operation (total number of cooling towers being (i)) before the rotational speed becomes lower than the lower limit threshold value, and makes a setting so that a sum of amounts of the circulating cooling water supplied from the supplying units of the cooling towers that will be in operation in a number less by one (total number of cooling towers being (i−1)) than the number of the cooling towers that are currently in operation will be equal to a sum of amounts of the circulating cooling water supplied from the supplying units of the cooling towers that are in operation (total number of cooling towers being (i)) before the rotational speed becomes lower than the lower limit threshold value, and stops the rotation of the cooling fan of one of the cooling towers and stops supplying the circulating cooling water thereto.

Another Embodiment

In the present embodiment, the controlling unit 20 may receive a measured temperature TE2 from a thermometer 32 that measures the temperature TE2 of the circulating cooling water W flowing through the return pipe L2 and store the temperature TE2 in the first memory 23.

In the present embodiment, the order of "first, second, and third" may represent an arbitrary designation and does not absolutely specify one or all of these. For example, the order of "first to third" in the first load period may not completely coincide with the order of "first to third" in the second load period, so that, for example, the order of "first" in the first load period may correspond to the order of "second" or "third" in the second load period.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A cooling tower controlling system for controlling a plurality of cooling towers that perform temperature control of cooling water used for heat exchange with equipment, comprising:

the plurality of cooling towers each having a cooling fan, a motor configured to rotate the cooling fan, a supplying unit configured to supply circulating cooling water that has passed through a heat exchanger to the cooling tower, and a storage tank configured to store the circulating cooling water that has been cooled by air blowing of the cooling fan, wherein the supplying unit comprises a pipe, a sluice valve, and a plurality of nozzles;

a plurality of pumps configured to send the circulating cooling water from the storage tank to the heat exchanger;

a circulation line having a pipe that connects respectively between the storage tank and the pumps, between the pumps and the heat exchanger, and between the heat exchanger and the supplying units of the cooling towers, so as to allow the circulating cooling water to flow therethrough; and a controller configured and programmed to control a rotational speed of the cooling fans with respective rotation driving units based on a first load in a first load period of the equipment and a second load in a second load period of the equipment, wherein an absolute value $\Delta TE$ of a difference between a temperature $TE1$ and an outside air wet-bulb temperature $TE0$ is less than or equal to a first approach temperature $AP1$, which corresponds to the first load, in the first load period of the equipment, wherein the absolute value $\Delta TE$ of the difference between the temperature $TE1$ and the outside air wet-bulb temperature $TE0$ is less than or equal to a second approach temperature $AP2$, which corresponds to the second load that is higher than the first load, and wherein the second approach temperature $AP2$ has a lower value than the first approach temperature $AP1$, in the second load period of the equipment, wherein the temperature $TE1$ is a temperature of the circulating cooling water within the circulation line at a position upstream of the heat exchanger and downstream of the storage tank or a temperature of the circulating cooling water within the storage tank or within the pumps.

2. The cooling tower controlling system according to claim 1, wherein the controller is configured to switch from the first approach temperature $AP1$ to the second approach temperature $AP2$ before a load of the equipment is switched from the first load to the second load, so as to allow the absolute value $\Delta TE$ of the difference to be less than or equal to the second approach temperature $AP2$, and subsequently, operation is switched from the first load controlling unit to the second load controlling unit, and/or the controller is configured to switch from the second approach temperature $AP2$ to the first approach temperature $AP1$ before the load of the equipment is switched from the second load to the first load, so as to allow the absolute value $\Delta TE$ of the difference to be less than or equal to the first approach temperature $AP1$, and subsequently, operation is switched from the second load controlling unit to the first load controlling unit.

3. The cooling tower controlling system according to claim 1, wherein, when the rotational speed of at least one or all of the cooling fans of the cooling towers that are in operation exceeds an upper limit threshold value, the controller is configured to establish a setting so that a sum of air flow amounts of the cooling fans of the cooling towers currently in operation and a newly operated cooling tower will be equal to a sum of air flow amounts of the cooling fans of the cooling towers that are in operation before the rotational speed exceeds the upper limit threshold value, and makes a setting so that a sum of amounts of the circulating cooling water supplied from the supplying units of the cooling towers currently in operation and the newly operated cooling tower will be equal to a sum of amounts of the circulating cooling water supplied from the supplying units of the cooling towers that are in operation before the rotational speed exceeds the upper limit threshold value.

4. The cooling tower controlling system according to claim 1, wherein, when the rotational speed of at least one or all of the cooling fans of the cooling towers that are in operation becomes lower than a lower limit threshold value, the controller is configured to establish a setting so that a sum of air flow amounts of the cooling fans of the cooling towers that will be in operation in a number less by one than the number of the cooling towers that are currently in operation will be equal to a sum of air flow amounts of the cooling fans of the cooling towers that are in operation before the rotational speed becomes lower than the lower limit threshold value, and makes a setting so that a sum of amounts of the circulating cooling water supplied from the supplying units of the cooling towers that will be in operation in a number less by one than the number of the cooling towers that are currently in operation will be equal to a sum of amounts of the circulating cooling water supplied from the supplying units of the cooling towers that are in operation before the rotational speed becomes lower than the lower limit threshold value, and stops the rotation of the cooling fan of one of the cooling towers and stops supplying the circulating cooling water thereto.

5. The cooling tower controlling system according to claim 1, wherein, when the outside air wet-bulb temperature $TE0$ is lower than a set value of a minimum temperature of the circulating cooling water by a predetermined value or more, controller is configured to control the plurality of cooling towers so that the temperature TE1 of the circulating cooling water will be the set value of the minimum temperature of the circulating cooling water.

6. A cooling tower controlling method for controlling a plurality of cooling towers, each having a cooling fan, that perform temperature control of cooling water used for heat exchange with equipment, comprising:
a first load controlling step that controls a rotational speed of the cooling fans so that an absolute value $\Delta TE$ of a difference between a temperature TE1 of circulating cooling water at a position between a heat exchanger and a storage tank of the cooling towers and an outside air wet-bulb temperature TE0 comes within a first approach temperature AP1, which corresponds to a first load, in a first load period of the equipment; and
a second load controlling step that controls the rotational speed of the cooling fans so that the absolute value $\Delta TE$ of the difference between the temperature TE1 of the circulating cooling water at the position between the heat exchanger and the storage tank of the cooling towers and the outside air wet-bulb temperature TE0 is less than or equal to a second approach temperature AP2, which corresponds to the second load that is higher than the first load, and wherein the second approach temperature AP2 has a lower value than the first approach temperature AP1, in a second load period of the equipment.

7. The cooling tower controlling method according to claim 6, wherein
the first load controlling step is adapted to perform a control to switch from the first approach temperature AP1 to the second approach temperature AP2 before a load of the equipment is switched from the first load to the second load, so as to allow the absolute value $\Delta TE$ of the difference to be less than or equal to the second approach temperature AP2, and subsequently, transition is made from the first load controlling step to the second load controlling step, and/or
the second load controlling step is adapted to perform a control to switch from the second approach temperature AP2 to the first approach temperature AP1 before the load of the equipment is switched from the second load to the first load, so as to allow the absolute value $\Delta TE$ of the difference to be less than or equal to the first approach temperature AP1, and subsequently, transition is made from the second load controlling step to the first load controlling step.

* * * * *